(12) United States Patent
Marupaduga

(10) Patent No.: US 10,299,221 B1
(45) Date of Patent: May 21, 2019

(54) SYSTEMS AND METHODS FOR MANAGING CHANNEL QUALITY FOR RELAY WIRELESS DEVICES

(71) Applicant: Sprint Spectrum LP, Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 41 days.

(21) Appl. No.: 15/598,743

(22) Filed: May 18, 2017

(51) Int. Cl.
| | | |
|---|---|---|
| *G08C 17/00* | (2006.01) | |
| *H04W 52/24* | (2009.01) | |
| *H04B 17/345* | (2015.01) | |
| *H04B 17/40* | (2015.01) | |
| *H04B 7/155* | (2006.01) | |
| *H04W 92/20* | (2009.01) | |

(52) U.S. Cl.
CPC ...... *H04W 52/243* (2013.01); *H04B 7/15528* (2013.01); *H04B 17/345* (2015.01); *H04B 17/40* (2015.01); *H04W 92/20* (2013.01)

(58) Field of Classification Search
CPC .............. H04W 52/243; H04W 92/20; H04B 7/15528; H04B 17/345; H04B 17/40
USPC ........................................................ 370/311
See application file for complete search history.

(56) References Cited

U.S. PATENT DOCUMENTS

| | | | |
|---|---|---|---|
| 9,136,997 B2 | 9/2015 | Gaal et al. | |
| 9,363,805 B2 | 6/2016 | Kim et al. | |
| 9,380,090 B2* | 6/2016 | Davydov | H04L 5/0085 |
| 9,860,849 B1* | 1/2018 | Naim | H04W 52/04 |
| 2009/0325625 A1* | 12/2009 | Hugl | H04W 52/16 455/522 |
| 2011/0319084 A1* | 12/2011 | Meshkati | H04W 36/20 455/436 |
| 2012/0140713 A1* | 6/2012 | Niu | H04B 7/024 370/329 |
| 2016/0029293 A1* | 1/2016 | Meshkati | H04W 36/20 455/411 |

\* cited by examiner

*Primary Examiner* — Chuong T Ho

(57) ABSTRACT

Exemplary embodiments described herein include systems, methods, and nodes for managing channel quality for a relay wireless device. Interference experienced in one or more sectors of an access node that include a relay wireless device may be monitored. It may be determined that the monitored interference in at least one sector of the access node meets a mitigation criteria. One or more potential interfering sectors from access nodes neighboring the access node that are performing reference signal power boosting may be identified such that the potential interfering sectors are adjacent to the one sector of the access node. One or more neighboring access nodes may be instructed to selectively reduce reference signal power boosting in the potential interfering sectors.

16 Claims, 9 Drawing Sheets

SYSTEMS AND METHODS FOR MANAGING CHANNEL QUALITY FOR RELAY WIRELESS DEVICES

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or access node (donor access node), and an end-user wireless device. Relay wireless devices may be used at the edge of a coverage area of an access node to improve coverage and/or service, as well as in crowded areas having a high number of other wireless devices to increase the available throughput to the end-user wireless devices being relayed. However, end-user wireless device performance can be dependent on the quality of the connection between the relay wireless device and the donor access node. Because of this dependency, techniques to enhance channel quality and mitigate interference between the relay wireless device and donor access node can provide benefits to users of the system.

Overview

Exemplary embodiments described herein include systems, methods, and nodes for managing channel quality for a relay wireless device. Interference experienced in one or more sectors of an access node that include a relay wireless device may be monitored. It may be determined that the monitored interference in at least one sector of the access node meets a mitigation criteria. One or more potential interfering sectors from access nodes neighboring the access node that are performing reference signal power boosting may be identified such that the potential interfering sectors are adjacent to the one sector of the access node. One or more neighboring access nodes may be instructed to selectively reduce reference signal power boosting in the potential interfering sectors.

DETAILED DESCRIPTION

In an embodiment, methods and system are described for managing channel quality for a relay wireless device. For example, a relay wireless device may connect a small cell to an access node such that the relay wireless device relays backhaul traffic to and from the access node and small cell. In some embodiments, the quality for communication between the relay wireless device and its donor access node can impact quality of service for end-user wireless devices serviced by the small cell. Accordingly, interference mitigation for sectors of an access node that include relay wireless devices may enhance end-user wireless device service quality.

For example, the identification of potential interfering sectors at neighboring access nodes can enable interference mitigation. In an embodiment, when such neighboring access nodes are performing reference signal power boosting, the power boosting may be selectively reduced such that the interference in the sector of the access node that includes the relay wireless device may be mitigated.

Figure 1:
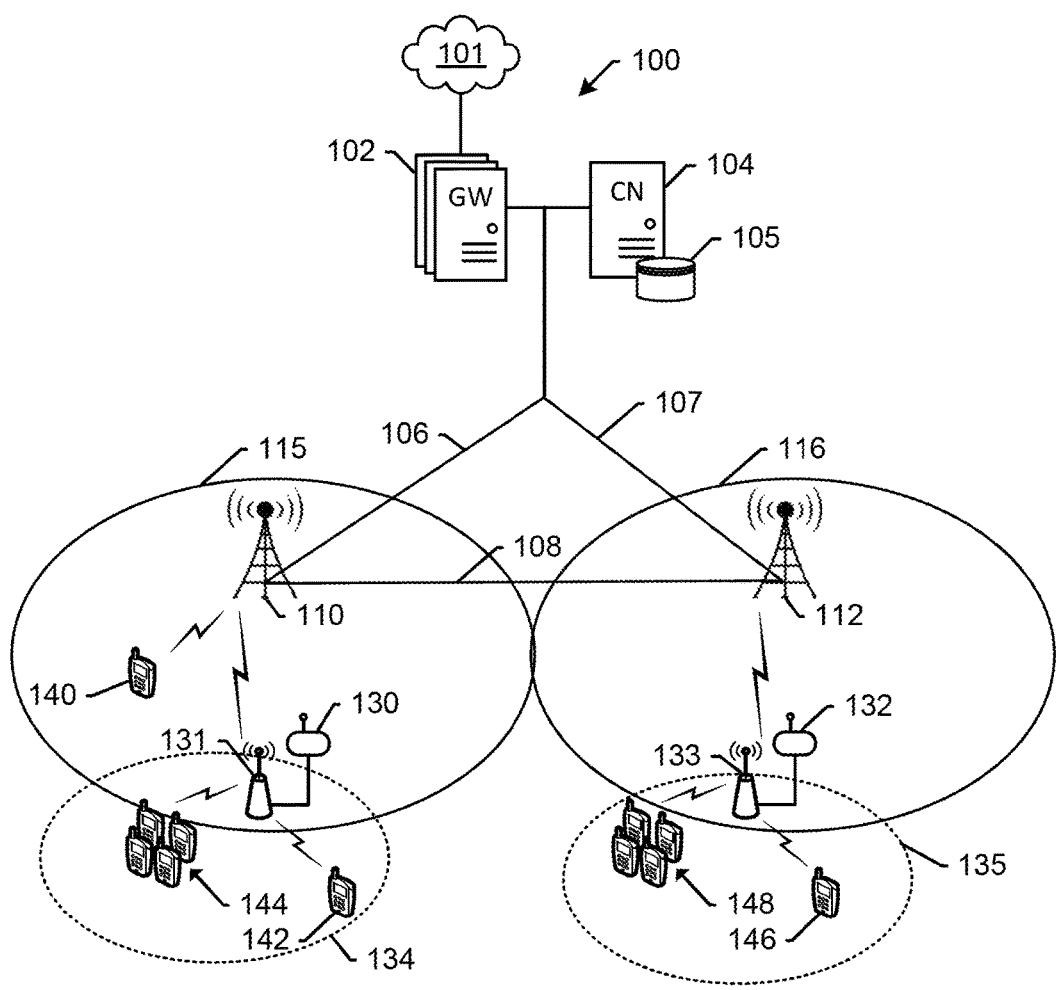
FIG. 1 depicts an exemplary system for managing channel quality of relay wireless devices.

FIG. 1 depicts an exemplary system 100 for managing channel quality of relay wireless devices. System 100 comprises a communication network 101, gateway nodes 102, controller node 104, access nodes 110 and 112, relay wireless devices 130 and 132, and wireless devices 140, 142, 144, 146, and 148, which may comprise end-user wireless devices. In this embodiment, access node 110 provides services to wireless devices 142 and 144 via relay access node that comprises a combination of relay wireless device 130 and small cell 131, which may comprise a relay access point or node, and access node 112 provides services to wireless devices 146 and 148 via relay access node that comprises a combination of relay wireless device 132 and small cell 133, which may comprise a relay access point or node. Consequently, access nodes 110 and 112 may be referred to as donor access nodes. Relay wireless device 130 is thus configured to relay services from access node 110 to wireless devices 142 and 144 and relay wireless device 132 is thus configured to relay services from access node 112 to wireless devices 146 and 148.

In an embodiment, to achieve this, relay wireless devices 130 and 132 may comprise a customer premise equipment (CPE), which may be any stationary LTE wireless device having a stronger computational & RF capability versus standard wireless devices, as well as a directional antenna and a dedicated power supply. Relay wireless device 130 also may be communicatively coupled to small cell 131, and relay wireless device 132 may be communicatively coupled to small cell 133. Small cells 131 and 133 may include a mini-macro, picocell, femtocell, or the like that are capable of providing a wireless access point for wireless devices 142, 144, 146, and 148, of which wireless devices 142 and 146 comprise a cluster of wireless devices. Access node 110 is illustrated as having coverage area 115, access node 112 is illustrated as having coverage area 116, small cell 131 is illustrated as having coverage area 134, small cell 133 is illustrated has having coverage area 135. Relay wireless devices 130 and 132 are located within coverage area 115. Wireless devices 140 is located within coverage area 115, wireless devices 142 and 144 are located outside coverage area 115 but within coverage area 134 of small cell 131, and wireless devices 146 and 148 are located outside coverage area 115 but within coverage area 135 of small cell 133. As a consequence, cluster of wireless devices 142 may access network services using the combination of relay wireless device 130 and small cell 131, rather than overload access node 110, which may be serving numerous other devices, such as wireless device 140. Wireless devices 146 and 148 may similarly access network services using relay wireless device 132 and small cell 133. Moreover, wireless device 144 that is outside coverage area 115 may access network services from access node 110 by virtue of being connected to relay wireless device 130 via small cell 131.

In an embodiment, relay wireless devices 130 and 132 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access nodes 110 and/or 112 are amplified and transmitted by relay wireless devices 130 and 132 to one or more of wireless devices 142, 144, 146, and 148. Likewise, RF signals received from wireless devices 142, 144, 146, and 148 are amplified and transmitted by relay wireless device 130 and 132, respectively, to either access node 110 or access node 112. Alternatively or in addition, a layer 2 relay device performs a decode and forward (DF) function. RF signals received from access node 110 or 112 are demodulated and decoded, then encoded and modulated again before being transmitted by relay wireless devices 130 and 132 to one or more of wireless devices 142, 144, 146, and 148. Likewise, RF signals received from one or more of wireless devices 142, 144, 146, and 148 are demodulated and decoded, then encoded and modulated again before being transmitted by relay wireless devices 130 and 132 to access node 110 or 112. Alternatively or in addition, a layer 3 relay device also performs a decode and forward function. However, a layer 3 relay device also performs additional processing (such as ciphering and/or data concatenation/segmentation/resassembly). In other words, relay wireless devices 130 and 132 may perform demodulation and decoding of the received RF signals (either uplink or downlink), processing of the received data, then encode, modulate, and transmit the data to one or more of wireless devices 142, 144, 146, and 148.

Relay wireless devices 130 and 132, and wireless devices 140, 142, 144, 146, and 148, may be any device, system, combination of devices, or other such communication platform capable of communicating wirelessly with access node 110 using one or more frequency bands deployed by access node 110. Relay wireless devices 130 and 132, and wireless devices 140, 142, 144, 146, and 148 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some embodiments, relay wireless devices 130 and 132 include stronger computational & radiofrequency capabilities than an average wireless device, as well as a directional antenna, and dedicated power supply, so that they can sustain an over-the-air backhaul link for wireless devices 142, 144, 146, and 148 that attach to small cells 131, and 133, respectively.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay wireless devices 130 and 132, and wireless devices 140, 142, 144, 146, and 148. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and World-wide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107, and 108 can use various communication media, such as air, space, metal, optical fiber, or some other signal propagation path—including combinations thereof. Communication links 106, 107, and 108 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof.

Communication links 106 and 107 may include S1 communications links and communication link 108 may comprise an X2 communication link. Other wireless protocols can also be used. Communication links 106, 107, and 108 can be a direct link or might include various equipment, intermediate components, systems, and networks. Communication links 106, 107, and 108 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-DW combination for providing gateway services to relay wireless devices 130 and 132, as well as a UE S-GW/P-DW combination for providing gateway services to one or more of wireless devices 140, 142, 144, 146, and 148. In embodiments, data packets such as voice over IP (VoIP) data packets may be routed from one or more of relay wireless devices 130 and 132, and wireless devices 140, 142, 144, 146, and 148 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access nodes 110 and 112 can be any network node configured to provide communication between relay wireless devices 130 and 132, and wireless devices 140, 142, 144, 146, and 148, and communication network 101. Access nodes 110 and 112 can be a macrocell access node such as a base transceiver station, a radio base station, an eNodeB device, or an enhanced eNodeB device, or the like. In an exemplary embodiment, a macrocell access node can have a coverage area 115 or 116 in the range of approximately five kilometers to thirty five kilometers and an output power in the tens of watts.

Small cells 131 and 133 may comprise a small access node, microcell access node, a picocell access node, a femtocell access node, or the like such as a home NodeB or a home eNodeB device. A coverage area for a small cell may be smaller than the overage area for a macro cell (e.g., access node 110). Moreover, it is noted that while access nodes 110 and 112, and small cells 131 and 133 are illustrated in FIG. 1, any number of access nodes and/or small cells can be implemented within system 100.

Access node 110 and 112 and small cells 131 and 133 can comprise a processor and associated circuitry to execute or direct the execution of computer-readable instructions to obtain information. Access node 110 and 112 and small cells 131 and 133 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 and 112 and small cells 131 and 133 can receive instructions and other input at a user interface. Access node 110 communicates with gateway nodes 102 and controller node 104 via communication link 106, access node 112 communicates with gateway nodes 102 and controller node 104 via communication link 107, and access node 110 communications with access node 112 over communication link 108. Operations performed by one or all of access node 110 and 112 and small cells 131 and 133 are further described herein with reference to FIGS. 4 and 6.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
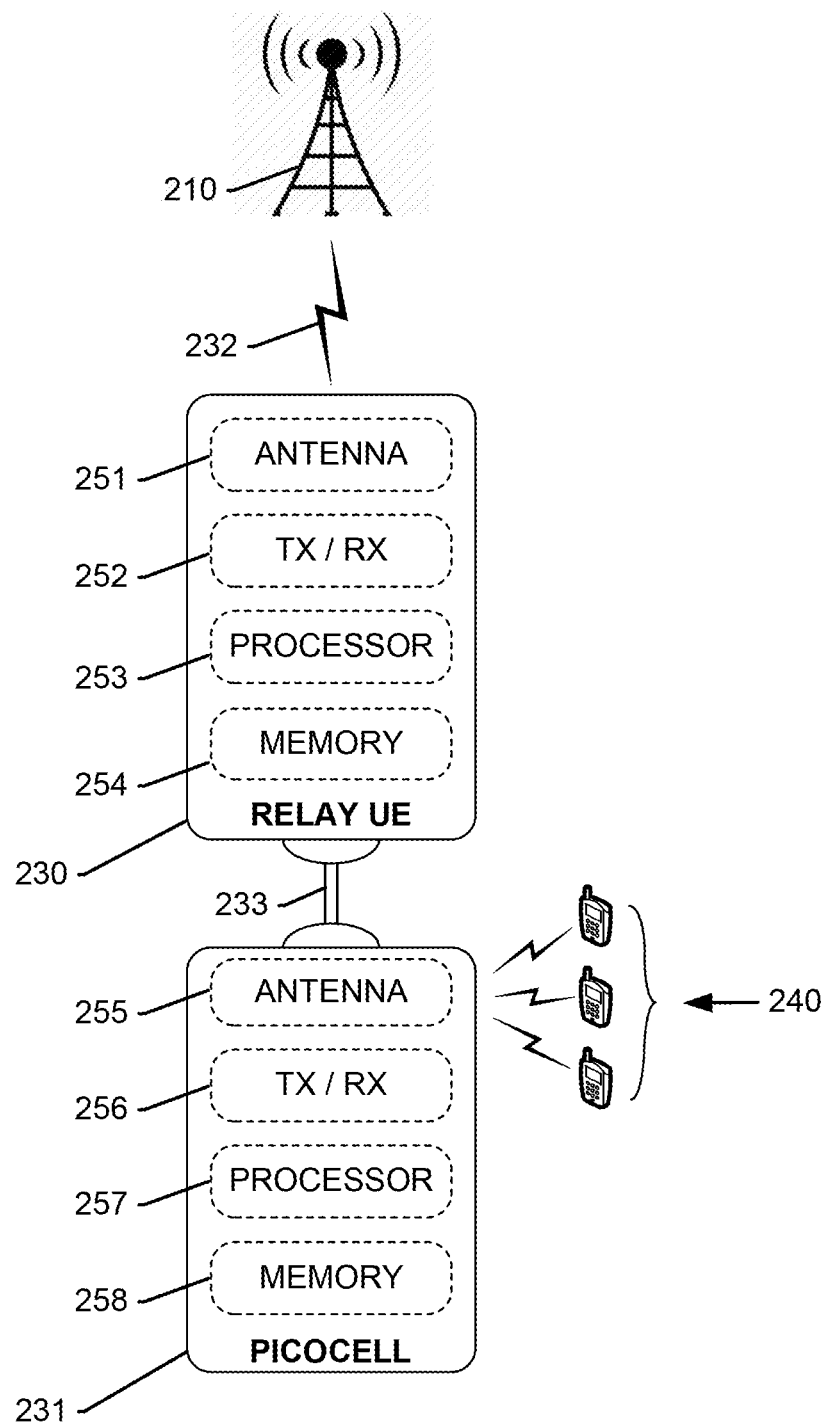
FIG. 2 depicts an exemplary relay wireless device coupled to a small cell.

FIG. 2 depicts an exemplary relay wireless device 230, or relay user equipment (UE), coupled to a small cell 231, or picocell. Relay wireless device 230 is illustrated as comprising an antenna 251 for direct (e.g., unrelayed) communication with access node 210 via communication link 232, a transceiver 252, a processor 253, and a memory 254 for storing instructions that enable relay wireless device 230 to perform operations described herein. In some embodiments, relay wireless device 230 is referred to as a customer premise equipment (CPE), which includes any stationary LTE wireless device having a stronger computational & RF capability versus standard wireless devices, as well as a directional antenna and a dedicated power supply, enabling relay wireless device 230 to efficiently provide resources to wireless devices 240 via small cell 231. Consequently, small cell 231 may be co-located with relay wireless device 230, and is connected to relay wireless device 230 via a communication interface 233. Communication interface 233 may be any interface that enables direct communication between relay wireless device 230 and small cell 231, such as USB, FireWire, Ethernet, or any other serial, parallel, analog, or digital interface. Small cell 231 is illustrated as comprising an antenna 255 for wireless communication with wireless device 240, a transceiver 256, a processor 257, and a memory 258 for storing instructions that enable small cell 231 to perform operations described herein. In some embodiments, small cell 231 may be a Home eNodeB. Moreover, although only one transceiver is depicted in each of relay wireless device 230 and small cell 231, additional transceivers may be incorporated in order to facilitate communication across interface 233 and other network elements.

In operation, relay wireless device 230 relays network services from access node 210 to wireless devices 240 (e.g., end-user wireless device) via small cell 231. Relay wireless device 230 may begin to function as a relay by sending a message to access node 210 to indicate to access node 210 that relay wireless device 230 is functioning as a relay. Access node 210 may consequently alter how relay wireless device 230 is assigned resources. In some embodiments, relay wireless device 230 can request to send a buffer status report to access node 210. Access node 210 can grant this request in a conventional manner. Relay wireless device 230 may respond to the grant by sending a short buffer status report. This short buffer status report may be associated with a logical channel group that indicates the buffer status report is communicating the status of the UE as a relay, and thus is not asking for additional resource allocations (like a 'conventional' buffer status report would indicate). In other words, in some embodiments, when a UE responds with a buffer status report for a predetermined logical channel group, it indicates that the UE is functioning as a relay rather than serving as a conventional buffer status report. Once status of relay wireless device 230 is established, relay wireless device 230 may instruct small cell 231 to start accepting connection requests from one or more of wireless devices 240.

Figure 3:
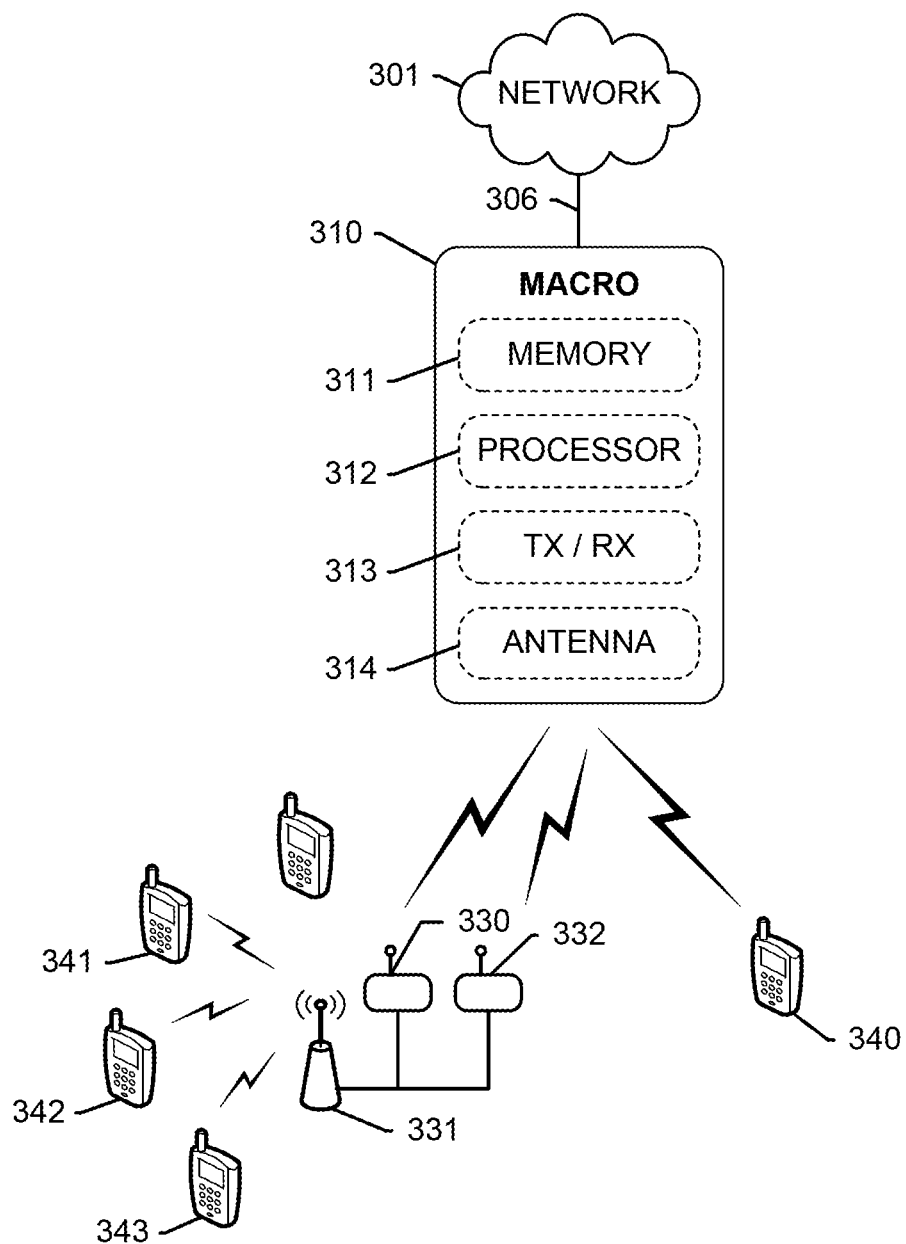
FIG. 3 depicts an exemplary access node.

FIG. 3 depicts an exemplary access node 310 which may comprise, for example, a macro access node. As described herein, access node 310 provides access to network services from network 301 to wireless devices 340, 341, 342, 343, which may comprise end-user wireless devices, either directly, or via relay wireless device 330 and small cell 331. In this embodiment, access node 310 is illustrated as being in communication with network 301 via communication link 306, and comprising a memory 311 for storing instructions that enable access node 310 to perform operations described herein. Further, access node 310 comprises a processor 312 for executing operations, and a transceiver 313 coupled to an antenna 314 for wireless communication with one or more wireless devices, such as wireless device 340, or relay wireless device 330. Further, communication link 306 may be any interface that enables communication between access node 310 and network 301, such as an Si interface. In some embodiments, access node 310 may be in communication with multiple relay wireless devices connected to small cell 331, such as one or both of relay wireless devices 330 and 332. Here, access node 310 provides access to network services from network 301 to wireless devices 340, 341, 342, 343, via relay wireless devices 330 and 332, and small cell 331. Other network nodes such as gateways and controllers may be present but are not shown for purposes of simplicity.

Referring back to FIG. 1, in operation, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, with regard to the quality of service provided by small cell 131 to its plurality of end-user wireless devices (e.g., wireless devices 142 and 144), the communication between relay wireless device 130 and access node 110 (e.g., which carries backhaul data for these end-user wireless devices) may impact and/or limit the service that the end-user wireless devices receive from system 100. For example, interference in one or more sectors of access node 110 that comprise a relay wireless device may impact the communication between the access node and the relay wireless device. Accordingly, interference mitigation for sectors of an access node that include relay wireless devices may enhance end-user wireless device service quality.

In an embodiment, the identification of potential interfering sectors at neighboring access nodes can enable interference mitigation. For example, the identity of potential interfering sectors of access node 112 can be used to mitigate interference in sectors of access node 110. In an embodiment, when such neighboring access nodes such as access node 112 are performing reference signal power boosting, the power boosting may be selectively reduced such that the interference in the sector of access node 110 that includes the relay wireless device may be mitigated.

Figure 4:
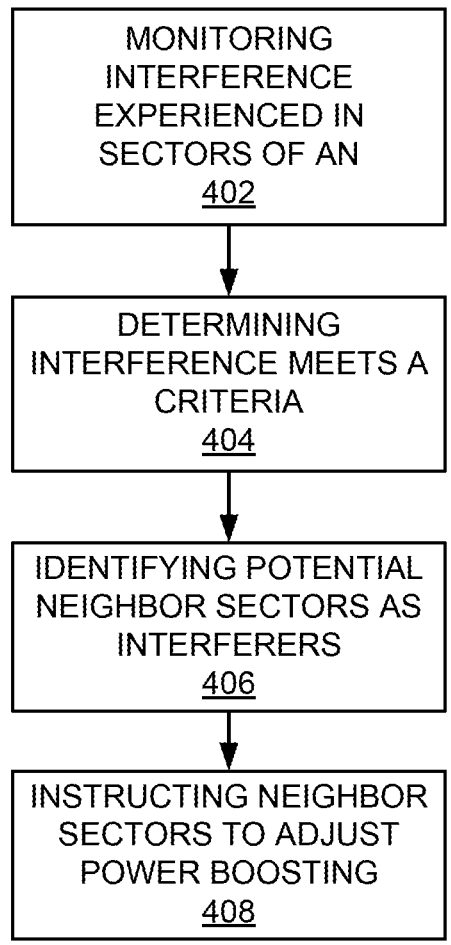
FIG. 4 depicts an exemplary method for managing channel quality of relay wireless devices.

FIG. 4 illustrates an exemplary method for managing channel quality of relay wireless devices according to an embodiment. The method will be discussed with reference to the exemplary communication system 100 illustrated in FIG. 1, however, the method can be implemented with any suitable communication system.

Referring to FIG. 4, at step 402, interference may be monitored that is experienced in one or more sectors of an access node that include a relay wireless device. For example, interference in one or more sectors of access node 110 that includes a relay wireless device, such as relay wireless device 130, may be monitored.

At step 404, it may be determined that the monitored interference meets a mitigation criteria. For example, the monitored interference in one or more sectors of access node 110 may be compared to a mitigation criteria. In an embodiment, the mitigation criteria may comprise an interference criteria and a channel quality criteria. Based on the monitored conditions at access node 110, it may be determined that the interference in one or more sectors of the access node meet the mitigation criteria.

At step 406, one or more potential interfering sectors from access nodes neighboring the access node that are performing reference signal power boosting may be identified such that the potential interfering sectors are adjacent to the one or more sectors of the access node that include a relay wireless device. For example, one or more potential interfering sectors from access node 112 (which neighbors access node 110) that are performing reference signal power boosting may be identified, where the identified sectors may be adjacent to the one or more sectors of the access node 110 that include a relay wireless device (e.g., relay wireless device 130). The identifying may be based on the signal area for the sector of access node 112, signal areas for the sectors of access node 110 that are determined to meet the mitigation criteria, and whether access node 112 is performing power boosting.

At step 408, one or more neighboring access nodes may be instructed to selectively reduce reference signal power boosting in the potential interfering sectors, the selective reduction being based on a presence of a relay wireless device in the potential interfering sectors. For example, access node 112 may be instructed to selectively reduce reference signal power boosting in an identified potential interfering sector. The selective reduction may comprise one or more of reducing the reference signal power boosting or disabling the reference signal power boosting, where the instruction to selectively reduce in a potential interfering sector may be based on the presence of a relay wireless device within the sector corresponding to the instruction.

Figure 5:
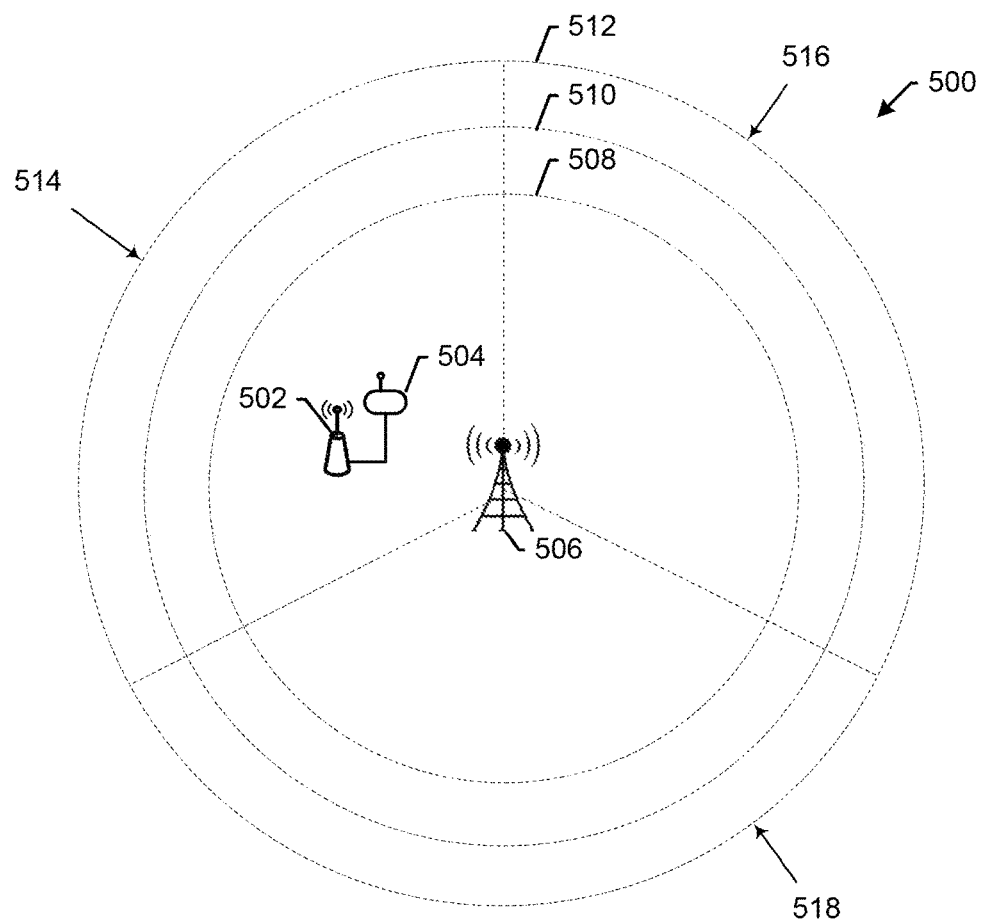
FIG. 5 depicts another exemplary system for managing channel quality of relay wireless devices.

FIG. 5 depicts an exemplary system 500 for managing channel quality for a relay wireless device according to an embodiment. System 500 comprises small cell 502, relay wireless device 504, access node 506, signal areas 508, 510, and 512, and sectors 514, 516, and 518. Access node 506 may be similar to access nodes 110 and 112 of FIG. 1. Similarly, small cell 502 may be similar to small cells 131 and 133 of FIG. 1 and relay wireless device 504 may be similar to relay wireless devices 130 and 132 of FIG. 1. In an embodiment, access nodes 506 and small cell 502 may service a plurality of (end-user) wireless devices.

In an embodiment, system 500 may use a plurality of carriers in order to provide wireless communication services, similar to system 100 of FIG. 1. In some embodiments, an access node or small cell may be divided into a plurality of cells. For example, a cell may comprise a sector for the access node or small cell. A sector may comprise an arc (such as a 120° arc) where a plurality of sectors comprise a coverage area for the access node or small cell (e.g., three 120° sectors, six 60° sectors, and the like). For example, access node 506 may comprise sectors 514, 516, and 518. In an embodiment, wireless devices may communicate with particular sectors of an access node. For example, relay wireless device 504 may be in communication with sector 514 of access node 506.

In an embodiment, access node 506 may also perform reference signal power boosting. For example, reference signal power boosting may be performed at an access node to transmit a reference signal from the access node with an increased signal level and, thus, a greater reference signal radius. Power boosting may be performed to increase quality of service (QoS) to wireless devices. For example, a reference signal according to the protocol may be used for channel estimation and, ultimately, a boost in the reference signal power can be used to improve channel quality. These improved channel conditions can lead to an improved QoS for the wireless devices communicating with the power boosting access node.

In an embodiment, power boosting may be performed in a multi-antenna configuration. For example, an access node may comprise at least two antennas and may implement a Multiple Input Multiple Output (MIMO) protocol for sending (as well as receiving) signals. In an embodiment, when a first of the at least two antennas is transmitting a reference signal, the second antenna may not transmit a signal. Accordingly, when the first antenna is transmitting a reference signal, power boosting of the reference signal may be accomplished by using signal power of the second antenna for the reference signal transmitted from the first antenna. Other suitable processes for increasing the transmitted signal level of a reference signal may also be implemented.

In an embodiment, access node 506 may comprise signal area 508 when the access node is not transmitting a power boosted reference signal. In this example, signal area 508 may comprise a signal area (e.g., geographic area, such as a perimeter) around access node 506 such that a reference signal transmitted from the access node can be received at a minimum signal level. In an embodiment, when access node 506 is performing power boosting, the access node may comprise signal area 510. For example, the signal area 510 is larger than signal area 508 based on the increased transmit power for the reference signal transmitted from access node 506 when performing power boosting.

In some embodiments, a transmit power for the reference signal when performing power boosting may be configured. For example, signal area 510 may illustrate the signal area for the reference signal transmitted from access node 506 at a first transmit power and signal area 512 may illustrate the signal area for the reference signal transmitted from access node 506 at a second transmit power. Here, the second transmit power may be greater than the first transmit power. For example, signal area 510 may illustrate the signal area for a reference signal that is boosted by a first value (e.g., 3 dB) and signal area 512 may illustrate the signal area for a reference signal that is boosted by a second value (e.g., 6 dB).

In an embodiment, access node 506 may selectively perform reference signal boosting for one or more sectors of the access node. For example, access node 506 may perform power boosting in sector 514 (e.g., to increase a channel quality for relay wireless device 504) while not performing power boosting in sector 516. In other examples, access node 506 may boost a reference signal transmitted over sector 514 using a different value (e.g., 3 dB) than a boosted reference signal transmitted over a sector 516 (e.g., 6 db). For example, access node 506 may comprise 2, 4, 8, or more antennas, and may select a subset of the plurality of antennas for power boosting over sector 514 and a subset of the plurality of antennas for power boosting over sector 516. Other combinations of sector selective power boosting may be similarly implemented.

Figure 6:
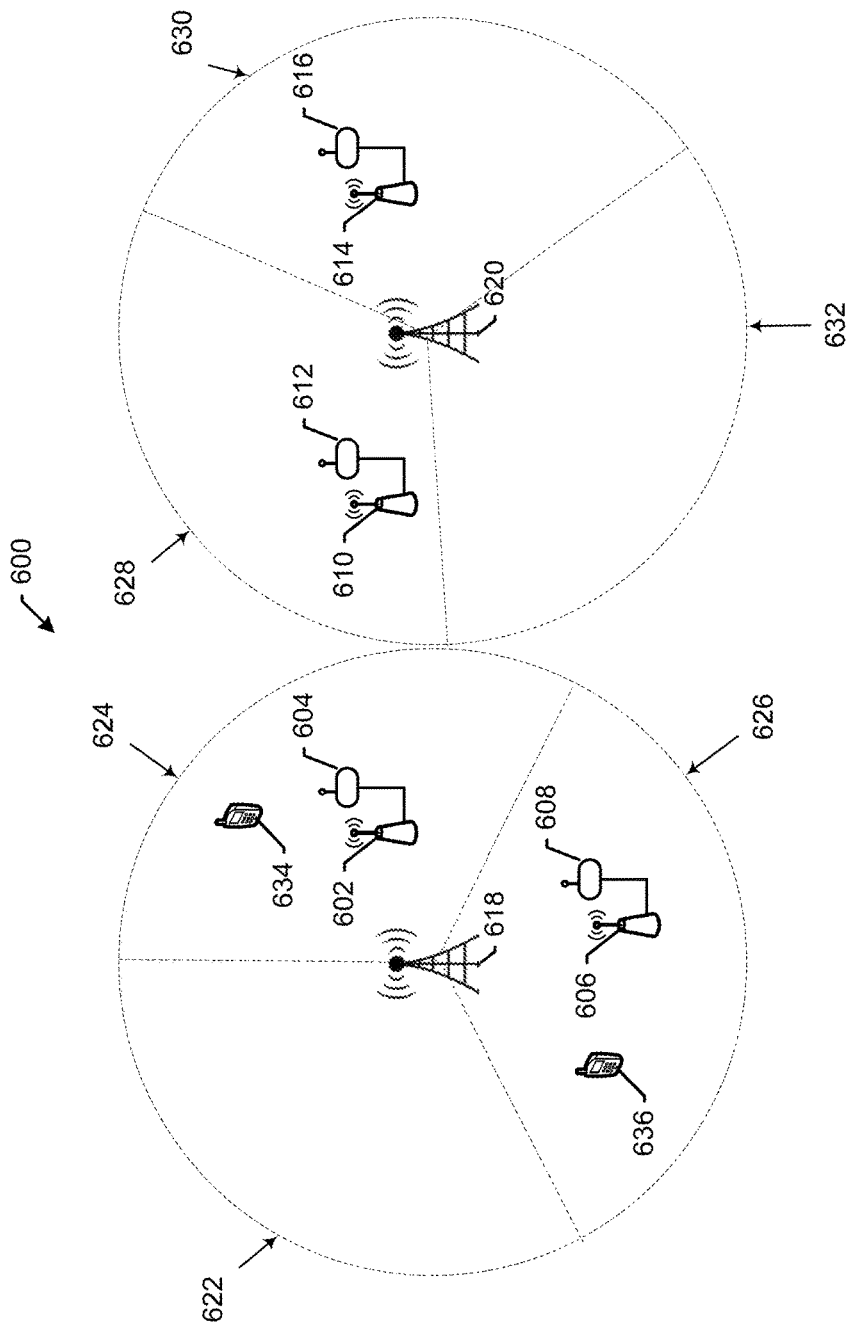
FIG. 6 depicts another exemplary system for managing channel quality of relay wireless devices.

FIG. 6 depicts an exemplary system 600 for managing channel quality for a relay wireless device according to an embodiment. System 600 comprises small cells 602, 606, 610, and 614, relay wireless devices 604, 608, 612, and 616, wireless devices 634 and 636, access nodes 618 and 620 and sectors 622, 624, 626, 628, 630, and 632. Access nodes 618 and 620 may be similar to access nodes 110 and 112 of FIG. 1. Similarly, small cells 602, 606, 610, and 614 may be similar to small cells 131 and 133 of FIG. 1 and relay wireless devices 604, 608, 612, and 616 may be similar to relay wireless devices 130 and 132 of FIG. 1. In an embodiment, access nodes 618 and 620, and small cells 602, 606, 610, and 614 may service a plurality of (end-user) wireless devices.

In an embodiment, system 600 may use a plurality of carriers in order to provide wireless communication services, similar to system 100 of FIG. 1. As illustrated, access node 618 may comprise sectors 622, 624, and 626 and access node 620 may comprise sectors 628, 630, and 632. Relay wireless device 604 may be in communication with sector 624, relay wireless device 608 may be in communication with sector 626, relay wireless device 612 may be in communication with sector 628, and relay wireless device 616 may be in communication with sector 630. In some embodiments, one or more sectors of access nodes 618 and 620 may be transmitting a power boosted reference signal that comprise an increased signal level boosted by one or more signal level values (e.g., 3 dB, 6 dB, and the like). Accordingly, interference experienced in at least one sector of access node 618 (e.g., sector 624) may be mitigated using one or more techniques to manage a channel quality for relay wireless devices communicating in the sector.

Figure 7:
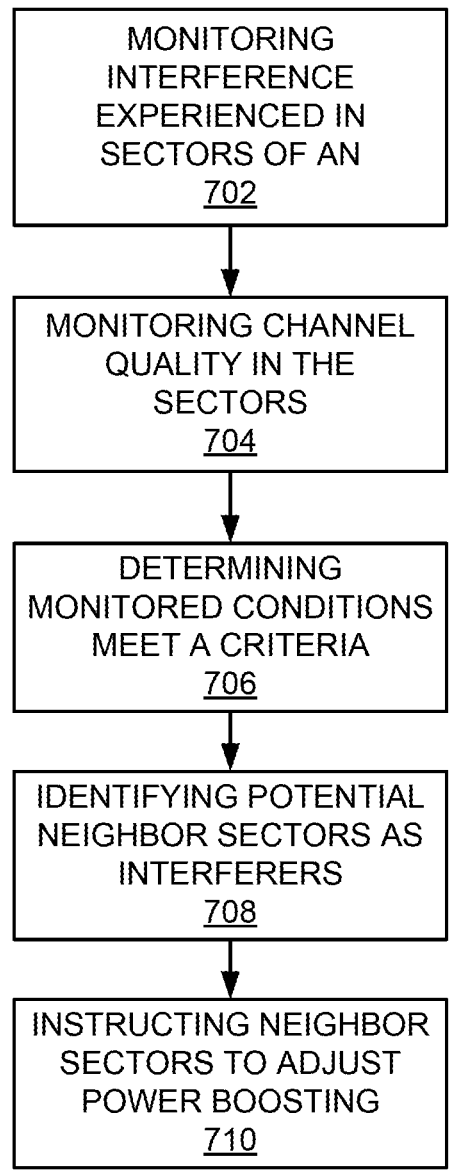
FIG. 7 depicts another exemplary method for managing channel quality of relay wireless devices.

FIG. 7 illustrates an exemplary method for managing channel quality for a relay wireless device according to an embodiment. The method will be discussed with reference to the exemplary communication system 600 illustrated in FIG. 6, however, the method can be implemented with any suitable communication system.

Referring to FIG. 7, at step 702, interference may be monitored that is experienced in one or more sectors of an access node that include a relay wireless device. For example, interference in one or more sectors of access node 618 that includes a relay wireless device (e.g., sectors 624 and 626), such as relay wireless device 604, may be monitored. In an embodiment, the monitored interference may comprise interference monitored for a plurality of wireless device in communication with a sector, or interference monitored for the relay wireless devices in communication with the sector. For example, interference monitored in sector 624 may comprise interference monitored for a plurality of wireless devices (e.g., relay wireless devices 604, wireless devices 634, and other end-user wireless devices not depicted) or interference monitored for relay wireless device 604 and other relay wireless devices not depicted (e.g., not including end-user wireless devices).

In an embodiment, the monitored interference may comprise monitoring one or more conditions for communication with sectors of access node 618. For example, communication between sector 624 and wireless devices may include an error rate (e.g., block error rate (BLER)), a number of retransmission request (e.g., hybrid automatic repeat retransmission requests), such as an average number of retransmissions until a transmission is successfully received, and the like. The monitored interference may comprise a BLER for wireless devices in communication with sector 618, a number of retransmission requests from wireless devices, such as the average number of retransmission requests, and the like, where the monitored interference occurs over a predetermined period of time (e.g., minutes, hours, days, and the like).

At step 704, a channel quality may be monitored in one or more sectors of an access node that include a relay wireless device. For example, channel quality for one or more sectors of access node 618 that includes a relay wireless device (e.g., sectors 624 and 626), such as relay wireless device 604, may be monitored. In an embodiment, the monitored channel quality may comprise conditions monitored for a plurality of wireless device in communication with a sector, or conditions monitored for the relay wireless device in communication with the sector. For example, channel quality monitored in sector 624 may comprise conditions monitored for a plurality of wireless devices (e.g., relay wireless devices 604, wireless devices 634, and other end-user wireless devices not depicted) or conditions monitored for relay wireless device 604 and other relay wireless devices not depicted (e.g., not including end-user wireless devices).

In an embodiment, the monitored channel quality may comprise monitoring one or more conditions for communication with sectors of access node 618. For example, communication between sector 624 and wireless devices may include a channel quality indictor (e.g., CQI), or a similar channel quality metric. In an embodiment, CQIs may be reported from wireless devices to sector 624 of access node 618 at various points in time while the wireless devices communicate with the sector (e.g. based on a predetermined period for CQI reports, based on a reporting event being triggered at the wireless devices, and the like). The reported CQIs may comprise a range of values (e.g., 0-15) that indicate the channel quality for a wireless device while communicating with sector 624. In an embodiment, the monitored channel quality may comprise CQIs (e.g., an average value for CQIs) monitored for wireless devices over a predetermined period of time (e.g., minutes, hours, days, and the like).

At step 706, it may be determined that the monitored interference meets a mitigation criteria. For example, the monitored interference in one or more sectors of access node 618 that comprise a relay wireless device (e.g., sectors 624 and 626) may be compared to a mitigation criteria. In an embodiment, the mitigation criteria may comprise an interference criteria and a channel quality criteria. Based on the monitored conditions at access node 618, it may be determined that the monitored interference in one of the sectors of the access node meets the mitigation criteria or that the monitored interference in the one sector and monitored channel quality indicators (CQIs) for the one sector meet the mitigation criteria.

In an embodiment, the mitigation criteria may comprise an interference criteria. For example, where the monitored interference comprises a BLER and/or a number of retransmission requests, the interference criteria may comprise one or more of a BLER threshold (e.g., 5%, 10%, 15%, and the like), a number of retransmission requests threshold, and an average number of retransmission requests threshold (e.g., 2, 3, or more retransmission requests before a transmission is successfully received). In an embodiment, a monitored interference may fail to meet the interference criteria when a monitored BLER exceeds the BLER threshold, a monitored number of retransmission requests exceeds the retransmission threshold, and a monitored average number of retransmission requests exceeds the average retransmission threshold.

In an embodiment, the mitigation criteria may comprise a channel quality criteria. For example, when the monitored channel quality comprises a CQI or an average CQI, the channel quality criteria may comprise a CQI threshold (e.g., CQI of 5, 6, 7, and the like). In an embodiment, a monitored channel quality may fail to meet the channel quality criteria when the monitored CQIs or average CQI is below the CQI threshold.

In an embodiment, monitored conditions at sector 624 may meet the mitigation criteria. For example, the monitored interference in sector 624 and the monitored CQIs for sector 624 may meet the mitigation criteria. The monitored conditions that meet the mitigation criteria may be monitored for communication with a plurality of wireless devices (e.g., wireless device 634 and relay wireless device 604) or for one or more relay wireless devices (e.g., relay wireless device 604 without wireless device 634).

At step 708, one or more potential interfering sectors from access nodes neighboring the access node that are performing reference signal power boosting may be identified such that the potential interfering sectors may be adjacent to the one sector of the access node that meets the mitigation criteria. For example, one or more potential interfering sectors from access node 620 (which neighbors access node 618) that are performing reference signal power boosting may be identified, where the identified sectors may overlap or be adjacent to one or more sectors of the access node 618 that meet the mitigation criteria. The identifying may be based on the signal area for the sector of access node 620, signal areas for the sectors of access node 618 that are determined to meet the mitigation criteria, and whether access node 620 is performing power boosting.

In an embodiment where sector 624 is determined to meet the mitigation criteria, one or more sectors of neighboring access node 620 may be identified as a potential interfering sector for sector 624. For example, one or more neighboring access nodes to access node 618 may be identified as neighbors, for example based on a neighbor relations table (NRT) for the access node. In an embodiment, one or more neighboring cells that overlap or are adjacent to a signal area for sector 624 may be identified based on handover parameters for neighboring sectors. For example, where a wireless device has been handed over from sector 624 to a target sector (e.g., sector 632, sector 628, and the like), the target sector may be determined to be a neighboring sector that overlaps with or is adjacent to a signal area for sector 624. In some embodiments, access node 618 may comprise coverage information about sectors that overlap sector 624 or are adjacent to sector 624, and the coverage information may be accessed to identify potential interfering sectors for sector 624.

In an embodiment, access node 618 may comprise information about neighboring access nodes that are performing reference signal power boosting. For example, when access node 620 transmits a reference signal with a boosted power, an indication may be transmitted to access node 618 (e.g., over an X2 communication link between the access nodes). The indication may used for handovers between access node 618 and 620, inter-cell interference coordination (e.g., ICIC), and other functionality where access node 618 and 620 coordinate. In an embodiment, potential interfering sectors that overlap or are adjacent to sector 624 may be identified based on the indication about neighboring access nodes that are performing power boosting. For example, because sectors 628 and 632 are identified as overlapping or being adjacent to sector 624, and because access node 618 receives an indication that access node 620 is performing power boosting, sectors 628 and 632 may be identified as potential interfering sectors for sector 624. In some embodiments, access node 618 may communicate with access node 620 (e.g. over an X2 connection) to determine whether the individual sectors that overlap or are adjacent to sector 624 are transmitting a boosted reference signal, and one or more of sectors 628 and 632 may be identified as potential interfering sectors when the sectors are determined to be transmitting a boosted reference signal.

At step 710, one or more neighboring access nodes may be instructed to selectively reduce reference signal power boosting in the potential interfering sectors, the selective reduction being based on a presence of a relay wireless device in the potential interfering sectors. For example, access node 620 may be instructed to selectively reduce reference signal power boosting in an identified potential interfering sector (e.g., sectors 628 and 632). The selective reduction may comprise one or more of reducing the reference signal power boosting or disabling the reference signal power boosting, where the instruction to selectively reduce in a potential interfering sector may be based on the presence of a relay wireless device within the sector corresponding to the instruction.

In an embodiment, selectively reducing reference signal power boosting may comprise instructing access node 620 to disable reference signal power boosting in sector 632 because sector 632 does not include a relay wireless device. For example, the benefit to power boosting in sector 632 may be limited at least because the sector does not include a relay wireless device, and accordingly access node 620 may be instructed to disable power boosting in the sector to mitigate interference in sector 624 of access node 618.

In an embodiment, selectively reducing reference signal power boosting may comprise instructing access node 620 to selectively reduce reference signal power boosting in sector 628 because sector 628 includes a relay wireless device. In an embodiment, a first difference may be determined between the monitored channel quality indicators for wireless devices in communication with sector 624 and the channel quality indicator criteria. For example, the first difference may comprise the difference between the average CQIs monitored over sector 624 and the CQI threshold. In an embodiment, a second difference may be determined between the monitored interference in sector 624 and the interference criteria. For example, the second difference may comprise the difference between the average number of retransmission monitored in sector 624 and the average number of retransmissions threshold.

In an embodiment, the reference signal power level in sector 628 may be selectively reduced based on the first difference and the second difference. For example, the reduction in the reference signal power level over sector 628 may be directly related to the first difference and the second difference. In other words, the larger the difference between the monitored channel quality and the channel quality threshold and the monitored interference and the interference threshold, the large the reduction in reference signal power level over sector 628. In an embodiment, a method as illustrated in FIG. 8 may be implemented to selectively reduce reference signal power boosting in sector 628.

Figure 8:
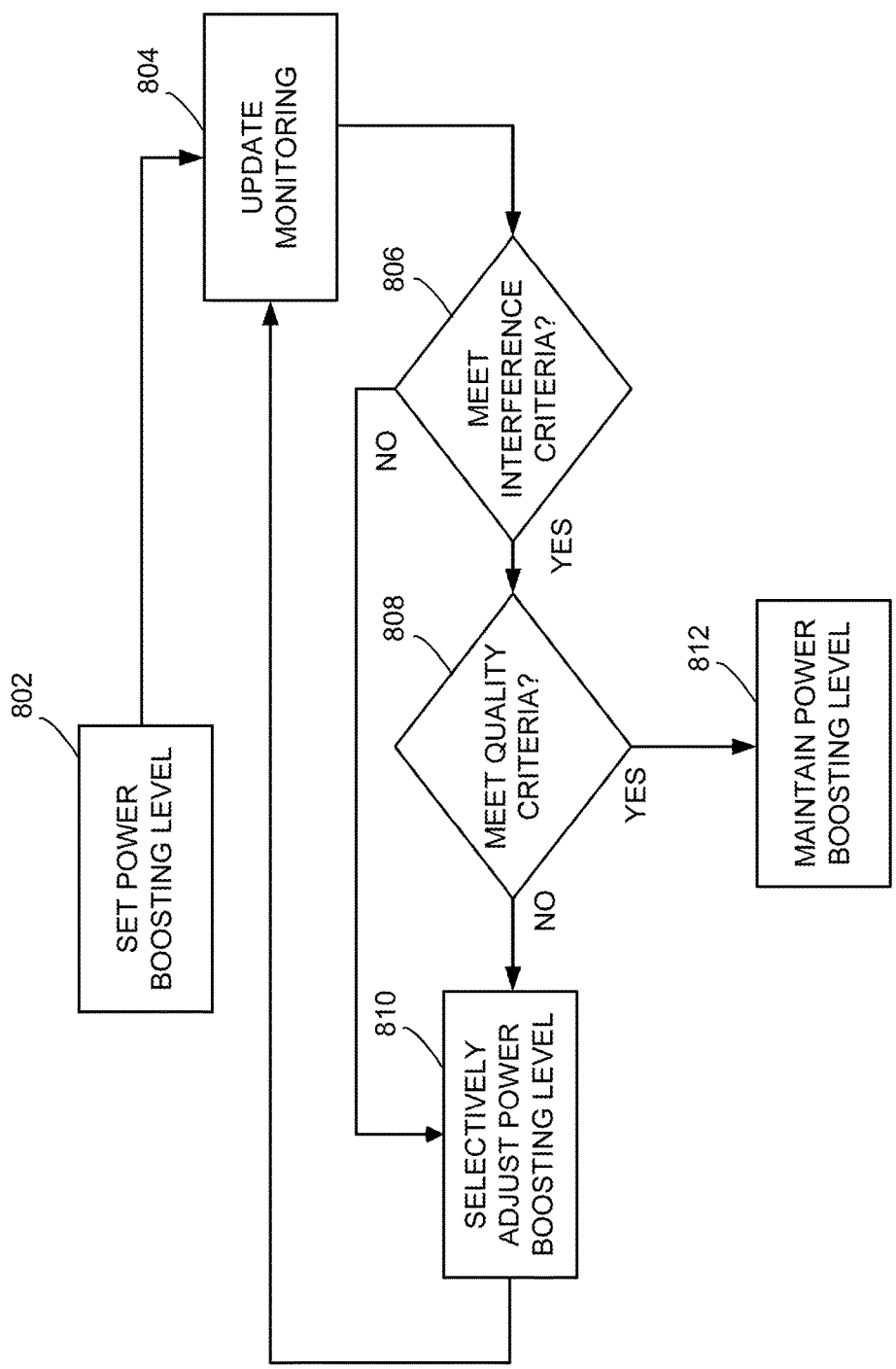
FIG. 8 depicts an exemplary method for selectively adjusting power boosting at a neighboring access node.

FIG. 8 illustrates an exemplary method for selectively adjusting power boosting at a neighboring access node according to an embodiment. The method will be discussed with reference to the exemplary communication system 600 illustrated in FIG. 6, however, the method can be implemented with any suitable communication system. In some embodiments, the method of FIG. 8 may be implemented in combination with the method of FIG. 7 to selectively reduce power boosting in identified potential interfering sectors.

Referring to FIG. 8, at step 802, an access node may be instructed to set a signal power for transmission of a reference signal over a sector identified as a potential interfering sector. For example, sector 628 may comprise relay wireless device 612 and may be identified as a potential interfering sector for sector 624, which may both comprise relay wireless device 604 and meet a mitigation criteria. In an embodiment, access node 620 may be instructed to set a power for transmission of a reference signal over sector 628. In an example, the set power may comprise the current power being used to transmit a reference signal over sector 628 while performing power boosting (e.g., default power plus 3 dB, or 6 dB, or the like)

At step 804, an updated interference and an updated channel quality indicator may be monitored for the sector that meets the mitigation criteria. For example, an updated interference (e.g., BLER, number of retransmission, and the like) and an updated channel quality (e.g., CQIs) may be monitored over sector 624. The updated interference and channel quality may be monitored in a manner similar to step 702 of FIG. 7.

At step 806, the updated interference may be compared to the interference criteria. For example, one or more of an updated BLER, number of retransmissions, and average number of retransmissions may be compared to a BLER threshold, a number of retransmissions threshold, and an average number of retransmissions threshold. The comparison may be similar to the comparison described with reference to step 706 of FIG. 7. When the updated interference meets the interference criteria, the method may progress to step 808. When the updated interference fails to meet the interference criteria, the method may progress to step 810.

At step 808, the updated channel quality may be compared to the channel quality criteria. For example, an updated channel quality or an updated average channel quality may be compared to a channel quality threshold. The comparison may be similar to the comparison described with reference to step 706 of FIG. 7. When the updated channel quality meets the channel quality criteria, the method may progress to step 812. When the updated channel quality fails to meet the channel quality criteria, the method may progress to step 810.

At step 810, the power of the reference signal transmitted over the potential interfering sector may be adjusted. For example, access node 620 may be instructed to reduce the power of the reference signal transmitted over sector 628. The reduction may comprise a stepwise reduction (e.g., 0.5 dB, 1 dB, 3 dB, and the like) such that the power of the reference signal transmitted over sector 628 is gradually reduced.

In an embodiment, the method may then return to step 812, where updated interference and updated channel quality conditions may be monitored over sector 624. The updated monitoring may occur over a predetermined period of time after the stepwise reduction to the power of the reference signal transmitted over sector 628. Once updated conditions are monitored (e.g., and after the predetermined period of time has expired), the method may progress to one or more of steps 806 and 808 to determine whether the updated interference and channel quality meet corresponding criteria. When the corresponding criteria still are not met, the method may perform another loop where the power level of the reference signal transmitted over sector 628 is reduced in a step wise manner. When the corresponding criteria are met, the method may progress to step 812, where the power level for the reference signal transmitted over sector 628 is maintained.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, relay wireless devices 130, 230, gateway nodes 102, and/or network 101.

Figure 9:
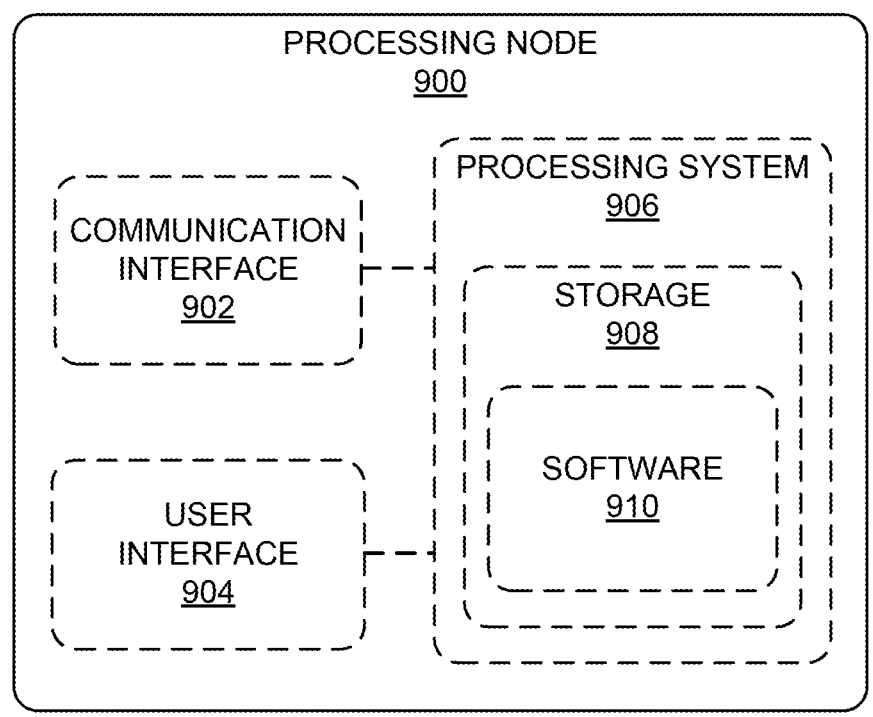
FIG. 9 depicts an exemplary processing node.

FIG. 9 depicts an exemplary processing node 900 comprising communication interface 902, user interface 904, and processing system 906 in communication with communication interface 902 and user interface 904. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. Software 910 may include computer programs, firmware, or some other form of machine-readable instructions, including an operating system, utilities, drivers, network interfaces, applications, or some other type of software. For example, software 910 may include modules for perform the operations described with reference to FIGS. 4, 7, and 8. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing channel quality for relay wireless devices, the method comprising:
    monitoring interference experienced in one or more sectors of an access node that include a relay wireless device;
    monitoring channel quality indicators for wireless devices in communication with the one or more sectors of the access node;
    determining that the monitored interference and the monitored channel quality indicators in at least one sector of the access node meets a mitigation criteria;
    identifying one or more potential interfering sectors from access nodes neighboring the access node that are performing reference signal power boosting such that the potential interfering sectors are adjacent to the one sector of the access node; and
    instructing one or more neighboring access nodes to selectively reduce reference signal power boosting in the potential interfering sectors based on a presence of the relay wireless device in the potential interfering sectors.

2. The method of claim 1, wherein determining that the monitored interference in the one sector of the access node meets a mitigation criteria further comprises:
    comparing, for the one sector of the access node, the monitored channel quality indicators to a quality criteria and the monitored interference to an interference criteria; and
    determining that the monitored interference in the one sector of the access node meets the mitigation criteria when the monitored channel quality indicators fail to meet the quality criteria and the monitored interference fails to meet the interference criteria.

3. The method of claim 1, wherein selectively reducing reference signal power boosting in the potential interfering sectors further comprises disabling reference signal power boosting for potential interfering sectors that do not include a relay wireless device.

4. The method of claim 1, wherein selectively reducing reference signal power boosting in the potential interfering sectors further comprises:
    reducing reference signal power boosting for one or more of the potential interfering sectors that include a relay wireless device;
    monitoring an updated interference for the one sector of the access node and updated channel quality indicators for wireless devices in communication with the one sector of the access node; and
    adjusting the reference signal power boosting for the one or more potential interfering sectors based on the updated interference and the updated channel quality indicators.

5. The method of claim 1, wherein selectively reducing reference signal power boosting in potential interfering sectors that include a relay wireless device further comprises:
- determining a first difference between the monitored channel quality indicators for the wireless devices in communication with the one sector of the access node and a channel quality indicator criteria;
- determining a second difference between the monitored interference and a interference criteria; and
- selectively reducing the reference signal power boosting in one or more of the potential interfering sectors that include a relay wireless device based on the first difference and the second difference.

6. The method of claim 5, wherein the reduction in the reference signal power boosting in one or more of the potential interfering sectors that include a relay wireless device is directly related to the first difference and the second difference.

7. The method of claim 1, further comprising:
- identifying the one or more potential interfering sectors from access nodes neighboring the access node that are performing reference signal power boosting based on communication over an X2 connection between the access node and neighboring access nodes.

8. The method of claim 7, further comprising:
- determining that one or more access nodes neighboring the access node are performing reference signal power boosting; and
- communicating with the determined neighboring access nodes to identify the one or more potential interfering sectors from the neighboring access nodes that are performing reference signal power boosting based on communication over the X2 connection between the access node and neighboring access nodes.

9. A system for managing channel quality for relay wireless devices, the system comprising:
- a processing node with a processor configured to:
  - monitor interference experienced in one or more sectors of an access node that include a relay wireless device;
  - monitor channel quality indicators for wireless devices in communication with the one or more sectors of the access node;
  - determine that the monitored interference and the monitored channel quality indicators in at least one sector of the access node meets a mitigation criteria;
  - identify one or more potential interfering sectors from access nodes neighboring the access node that are performing reference signal power boosting such that the potential interfering sectors are adjacent to the one sector of the access node; and
  - instruct one or more neighboring access nodes to selectively reduce reference signal power boosting in the potential interfering sectors based on a presence of the relay wireless device in the potential interfering sectors.

10. The system of claim 9, wherein determining that the monitored interference in the one sector of the access node meets a mitigation criteria further comprises:
- comparing, for the one sector of the access node, the monitored channel quality indicators to a quality criteria and the monitored interference to an interference criteria; and
- determining that the monitored interference in the one sector of the access node meets the mitigation criteria when the monitored channel quality indicators fail to meet the quality criteria and the monitored interference fails to meet the interference criteria.

11. The system of claim 9, wherein selectively reducing reference signal power boosting in the potential interfering sectors further comprises disabling reference signal power boosting for potential interfering sectors that do not include a relay wireless device.

12. The system of claim 9, wherein selectively reducing reference signal power boosting in the potential interfering sectors further comprises:
- reducing reference signal power boosting for one or more of the potential interfering sectors that include a relay wireless device;
- monitoring an updated interference for the one sector of the access node and updated channel quality indicators for wireless devices in communication with the one sector of the access node; and
- adjusting the reference signal power boosting for the one or more potential interfering sectors based on the updated interference and the updated channel quality indicators.

13. The system of claim 9, wherein selectively reducing reference signal power boosting in potential interfering sectors that include a relay wireless device further comprises:
- determining a first difference between the monitored channel quality indicators for the wireless devices in communication with the one sector of the access node and a channel quality indicator criteria;
- determining a second difference between the monitored interference and a interference criteria; and
- selectively reducing the reference signal power boosting in one or more of the potential interfering sectors that include a relay wireless device based on the first difference and the second difference.

14. The system of claim 13, wherein the reduction in the reference signal power boosting in one or more of the potential interfering sectors that include a relay wireless device is directly related to the first difference and the second difference.

15. The system of claim 9, wherein the processing node is further configured to:
- identifying the one or more potential interfering sectors from access nodes neighboring the access node that are performing reference signal power boosting based on communication over an X2 connection between the access node and neighboring access nodes.

16. The system of claim 15, wherein the processing node is further configured to:
- determining that one or more access nodes neighboring the access node are performing reference signal power boosting; and
- communicating with the determined neighboring access nodes to identify the one or more potential interfering sectors from the neighboring access nodes that are performing reference signal power boosting based on communication over the X2 connection between the access node and neighboring access nodes.

* * * * *